June 1, 1937.  E. PEARSON  2,082,301

HELICAL WIRE CURTAIN ROD, CLOTHESLINE, AND THE LIKE

Filed Oct. 9, 1936   2 Sheets-Sheet 1

INVENTOR
Edna Pearson
BY
Richard E. Babcock
ATTORNEY

June 1, 1937.  E. PEARSON  2,082,301

HELICAL WIRE CURTAIN ROD, CLOTHESLINE, AND THE LIKE

Filed Oct. 9, 1936  2 Sheets-Sheet 2

INVENTOR
Edna Pearson
BY
Richard E. Babcock
ATTORNEY

Patented June 1, 1937

2,082,301

UNITED STATES PATENT OFFICE 2,082,301

HELICAL WIRE CURTAIN ROD, CLOTHESLINE, AND THE LIKE

Edna Pearson, Liversedge, England

Application October 9, 1936, Serial No. 104,898
In Great Britain July 20, 1935

1 Claim. (Cl. 156—19)

Helical wire curtain rods or clothes lines as now made are usually constructed of wire, round in cross section, which is tightly coiled so that the convolutions form a continuous rod or line of the required length into the ends of which screws, of the wood screw type formation, are screwed to provide means by which they can be detachably connected to hooks or brackets screwed into the window frame, or the like, across which the rod or line is to be placed, and when used as a curtain rod, the required number of curtain rings are placed on the rod before attachment so that they can be slid along the same, if the curtain be used without rings, the rod is threaded through the hem or loops and then fixed in position.

Although such wire curtain rods or lines are of comparatively small diameter it is found in practice that the ridges formed by the convolutions of round wire militate against the easy gliding motion of the rings or curtains on the rods in the act of "drawing" the curtains or inserting the rod through the rings, hem or loops and it has been proposed to use wire of rectangular shape in cross section to form the helical rod but rods so formed, whilst permitting the curtain rings or curtains to slide more freely, have the disadvantage that it is difficult or impossible to form a secure connection at the end by means of the screw in fitments preferably used, and as such rods are produced to sell at a very low cost, it is not a practical proposition to solder or braze the end connections and such brazing would prevent detachment when it is desired to alter the length of the rod or line.

The object of the present invention is to provide a form of such helical wire curtain rods, clothes lines and the like, having a smooth exterior free from ridges along which the curtain rings, or curtains and the like, can glide and with which the usual screw in end connections can be used without any increase, or any appreciable increase, of production cost.

According to the present invention helical wire curtain rods, clothes lines and the like, are formed by wire which is shaped in cross section and is coiled to form a substantially smooth cylindrical exterior and to form internal screw threads, adapted to receive the usual screw in end connections such as screw eyes and the like. The said wire has a flat segment in cross section with a diametrically opposite segment of a contour other than flat, such as angular, half round, or with an angular or rounded ridge with side extensions and the coiling is effected so that the before mentioned flat surface is external whilst the angular, rounded, or ridged surface is internal and so that the exterior of the completed rod forms a substantially straight line in use.

The improved helical wire rod may be coiled with wire of the desired cross section to form a smooth exterior and with internal screw threads, produced by wire drawn to the desired cross section or produced by using round wire of suitable gauge rolled to the desired cross section either before coiling, or during the act of coiling, by rolls provided for the purpose.

The invention will be more particularly described by the aid of the accompanying drawings wherein the same reference letters or characters refer to the same thing or part throughout the several views and wherein:—

Figure 3 is a view corresponding to Figure 1 showing one form of a helical wire curtain rod or clothes line constructed according to the present invention of which

Figure 3:
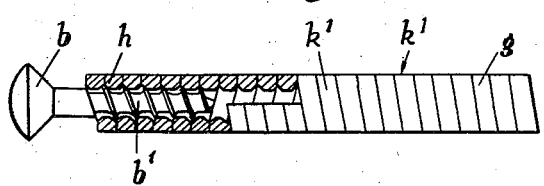
Figure 4:
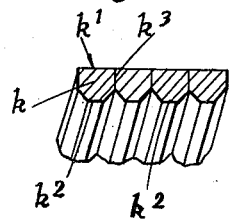
Figure 4 is a detailed sectional view showing the construction of the rod drawn to a still further enlarged scale.
Figure 5:
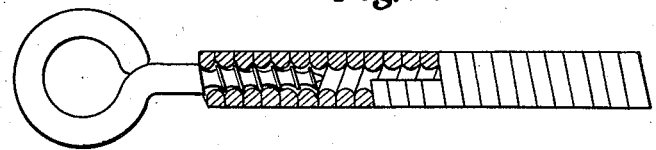
Figure 6:
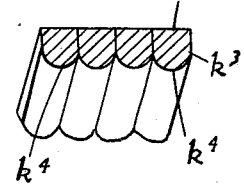
Figure 7:
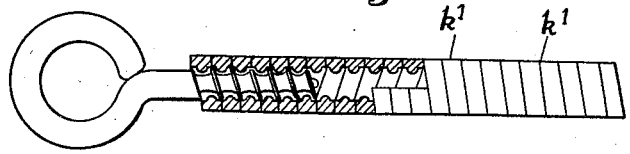
Figure 8:
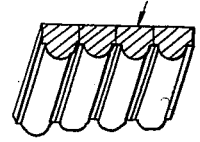

Figures 5 and 6 are views corresponding to Figures 3 and 4 respectively showing a modified form of the improved helical wire curtain rod or clothes line and Figures 7 and 8 are like views showing a still further modified form of the invention.

Figure 9:
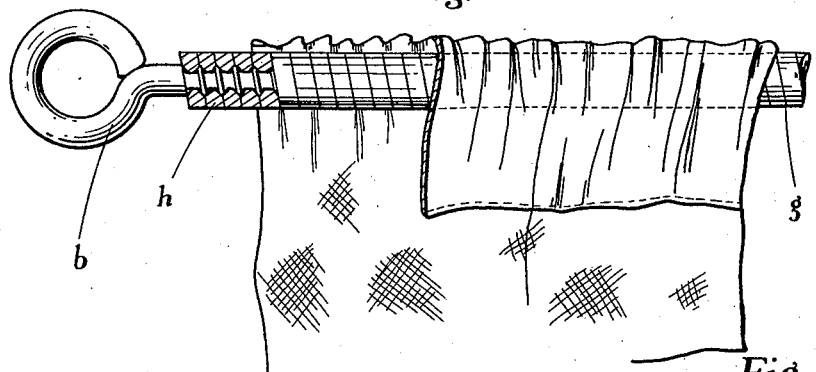

Figure 9 is a detailed sectional view of a still further modified form of curtain rod with a curtain shown in position thereon.

Figures 10, 11:
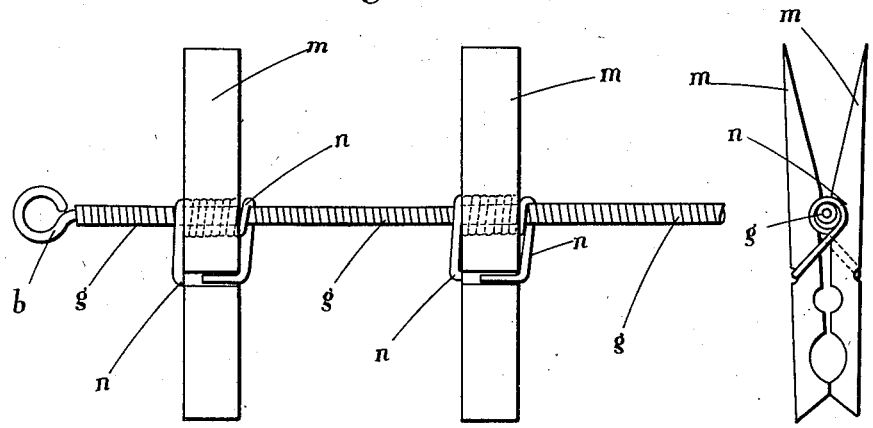

Figure 10 shows the invention adapted for a clothes line and

Figure 11 is an end view of Figure 10.

Figure 1:
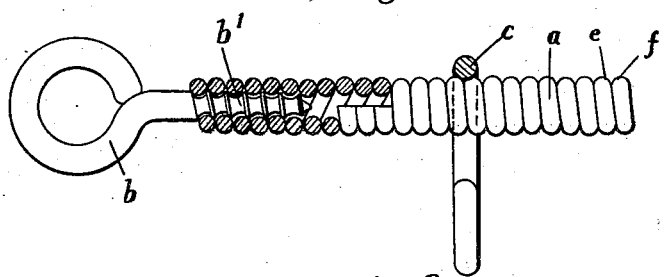
Figure 1 shows one end of a helical wire curtain rod or clothes line as now made partly in section with a curtain ring in position.
Figure 2:
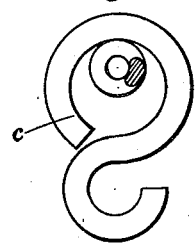
Figure 2 is an end view thereof.

Referring to Figures 1 and 2 of the drawings an helical wire curtain rod $a$ formed of round wire as now commonly coiled on a machine to produce the abutting convolutions is shown, both the external and internal surfaces being corrugated and whilst the internal corrugations or ridges serve the useful purpose of forming screw threads to receive the screw threads on the end $b^1$ of the screw eyes $b$ which are screwed therein to form the end connections by means of which the rod may be detachably secured in position, the external ridges are a disadvantage as the curtain rings $c$ settle in the depressions $e$ so formed and have to be snatched over the raised portion $f$ of each convolution in the act of drawing the curtain as will be clearly understood from the drawings. When curtain rings are dispensed with and the rod threaded directly through a hem in the curtain, the fabric settles in the depressions $e$ so as to render the passing of the rod through the hem or loops difficult and in use the curtain has to be jerked free as previously explained with reference to rings. This trouble is particularly intense in the case of curtains made of fine net material and the like.

Figures 3 and 4 show the improved method of constructing helical wire curtain rods $g$ according to the present invention with a substantially smooth cylindrical exterior surface upon which the curtain rings $c$ can glide smoothly whilst internal screw threads $h$ are formed to receive the screwed end $b^1$ of the screw $b$ which may be formed with a head as shown or with an eyelet or other suitable means for detachably connecting the rod to the brackets or hooks on the window frame or like fixture. The wire from which the coil is formed has a flat segment $k^1$ arranged externally and with a diametrically opposite surface formed to a blunt angle $k^2$ in cross section with substantially straight sides $k^3$. Said wire may be drawn to the cross section shown but preferably round wire is used and one of the feed rolls for the coiling machine is grooved to form the desired contour $k^2$ whilst the complemental roll is flat and sufficient pressure is applied to said feed rolls to force the wire into the groove as it is traversed between the same, the outer segment being flattened in the act of doing so, so that the resultant distortion of the wire produces the desired cross section which is coiled with the flat side outermost the coils being of the cross section shown at the left hand side of Figure 3 and in Figure 4, the screw threads $h$ permitting the connecting screws to be readily inserted and positively retaining the same in position against endwise movement whilst the exterior surface of the coil is free from undulations, ridges or depressions so that the curtain rings $c$ can glide smoothly and freely along the same.

Figures 5 and 6 show a somewhat similar construction but in this case the segment $k^4$ diametrically opposite to the flat segment $k^1$ is of half round shape in cross section the groove in the roll being formed of like contour in cross section to produce the desired result.

Instead of the angular or rounded contours $k^2$ and $k^4$ respectively extending from side to side of the wire in cross section it may be of like formation but of narrower width so as to form a ridge on the inside of the wire coils. Figures 7 and 8 showing such a construction with a half round ridge, but it will be understood that the wire may be formed to an infinite variety of shapes in the inner side with a flat outer shape in accordance with the invention.

Figure 9 shows the improved rod in use as a curtain rod and as applied to the hem thereof, dispensing with the aid of curtain hooks, and it will be clear from the drawings that the exterior of the rod constitutes a smooth cylindrical rod or line upon which the curtain fabric can slide smoothly. It will be noticed that the wire from which the rod or line is made is flat on the top side but of triangular shape in cross section on the underside but it is to be understood that the cross-sectional shape of the wire may be varied indefinitely whilst obtaining a smooth exterior with the desired internal screw threads. When used as a clothes line, spring clothes pegs $m$ may be slidably mounted on the line as seen in Figures 10 and 11 wherein the line $g$ is threaded through the convolutions of the springs $n$ which act upon the two halves of the peg to cause them to clamp on to the article to be suspended, any desired number, usually twelve being threaded on to the line before the end pieces $b$ are secured in position. By these means helical wire curtain rods, clothes lines and the like are produced with comparatively slight increase in manufacturing cost wherein a window rod, clothes line or the like is formed from helical wire having a true cylindrical outer surface equal to or approximating the smooth surface of a round metal rod or tube and to which screwed end connections can be readily applied and which will be positively held in position without any distortion of said ends or extraneous securing means.

Having now particularly described and ascertained the nature of my said invention and in what manner the same is to be performed, I declare that what I claim is:—

A device of the character set forth comprising a flexible body portion consisting of a strand of wire having a straight exterior face, side faces respectively extending substantially at right angles to said exterior face and parallel to each other and a tapering inner face, said wire being in the form of a helix with the straight exterior face of the strand disposed outward and forming a composite cylindrical face, with the adjacent side edges of the adjacent helices substantially in engagement for substantially their full areas and with the tapering inner face forming a continuous curvilinear thread, in combination with connecting means having screw-threaded shanks respectively engaging in the respective end portions of the said curvilinear thread formed in interior of the body portion by the tapering inner face of the wire strand.

EDNA PEARSON.